United States Patent
Kennel et al.

(10) Patent No.: US 12,468,986 B2
(45) Date of Patent: Nov. 11, 2025

(54) RANK DISTILLATION FOR TRAINING SUPERVISED MACHINE LEARNING MODELS

(71) Applicant: FAIR ISAAC CORPORATION, Roseville, MN (US)

(72) Inventors: Matthew Kennel, San Diego, CA (US); Scott Zoldi, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 899 days.

(21) Appl. No.: 17/564,042

(22) Filed: Dec. 28, 2021

(65) Prior Publication Data

US 2023/0206134 A1    Jun. 29, 2023

(51) Int. Cl.
*G06N 3/096* (2023.01)
*G06F 18/2113* (2023.01)
*G06F 18/214* (2023.01)
*G06N 20/20* (2019.01)

(52) U.S. Cl.
CPC ......... *G06N 20/20* (2019.01); *G06F 18/2113* (2023.01); *G06F 18/214* (2023.01)

(58) Field of Classification Search
CPC ........ G06N 20/20; G06N 3/045; G06N 3/096; G06N 5/01; G06F 18/2113; G06F 18/214; G06F 18/2415
See application file for complete search history.

(56) References Cited

U.S. PATENT DOCUMENTS

| | | | |
|---|---|---|---|
| 2001/0025232 A1* | 9/2001 | Klimasauskas | G05B 13/027 703/13 |
| 2020/0311540 A1* | 10/2020 | Chakraborty | G06N 3/08 |
| 2020/0334538 A1* | 10/2020 | Meng | G10L 15/16 |
| 2021/0182489 A1* | 6/2021 | Barkan | G06N 3/08 |
| 2021/0374279 A1* | 12/2021 | Zheng | G06N 3/088 |
| 2022/0207431 A1* | 6/2022 | Park | G06N 3/092 |
| 2022/0335303 A1* | 10/2022 | Haidar | G06N 3/096 |
| 2023/0169392 A1* | 6/2023 | Chaudhury | G06N 3/096 706/12 |

(Continued)

OTHER PUBLICATIONS

Ba, L.J. and R. Caruana. (2014). "Do Deep Nets Really Need to be Deep?" in Advances in Neural Information Processing Systems. 27. 9 pages.

(Continued)

*Primary Examiner* — Hien L Duong
(74) *Attorney, Agent, or Firm* — Mintz, Levin, Cohn, Ferris, Glovsky and Popeo, P.C.; F. Jason Far-hadian, Esq.

(57) ABSTRACT

Computer-implemented method and systems to improve training and performance of artificial intelligence (AI) systems having one or more machine learning models stored in one or more data storage mediums connected in at least one computing network is provided. The method comprises receiving student model scores, generated by a student machine learning model stored in a data storage medium, the student machine learning model having a primary loss function; receiving teacher scores provided by one or more analytic resources, the teacher scores being provided based on known results and behavior of pre-existing machine learning models used for accomplishing a first series of classification objectives; transforming the teacher scores into transformed teacher scores.

19 Claims, 6 Drawing Sheets

(56) References Cited

U.S. PATENT DOCUMENTS

2023/0196030 A1* 6/2023 Buduguppa ............ G06F 40/30
706/45
2024/0331371 A1* 10/2024 Chen ...................... G06V 10/82

OTHER PUBLICATIONS

Chen, Y. et al. (2017). "DarkRank: Accelerating Deep Metric Learning via Cross Sample Similarities Transfer," 9 pages. [Online]. Available: https://arxiv.org/abs/1707.01220.
Gou, J. et al. (2021). "Knowledge Distillation: A Survey," International Journal of Computer Vision, vol. 129, No. 6, pp. 1789-1819. 36 pages. [Online] Available: https://arxiv.org/abs/2006.05525.
Hinton, G. et al. (2015). "Distilling the Knowledge in a Neural Network," arXiv preprint arXiv: 1503.02531, 9 pages. [Online] Available: https://arxiv.org/abs/1503.02531.
Park, W. et al. (2019). "Relational Knowledge Distillation," 10 pages. [Online]. Available: https://arxiv.org/abs/1904.05068.
Reddi, S. et al. (2021). "RankDistil: Knowledge Distillation for Ranking," in Proceedings of the 24th International Conference on Artificial Intelligence and Statistics. 11 pages.

* cited by examiner

RANK DISTILLATION FOR TRAINING SUPERVISED MACHINE LEARNING MODELS

TECHNICAL FIELD

The disclosed subject matter is generally directed to a novel approach for improving the training and optimization of machine learning models, and more particularly to rank distillation for training supervised machine learning models.

BACKGROUND

Artificial intelligence (AI) systems and models are highly data driven electronically developed architectures that are typically implemented using machine learning. A machine learning model is created based on learning the mathematical representation of relationships that exist within a training dataset. A classification model, based on earlier training, yields classification scores or predictive probabilities in response to data fed to the model. Training an AI system involves providing input data to the model and adjusting influence of predictive features and model weights in the model's representative mathematical formula with the intention to improve the model's prediction accuracy.

AI systems are in use in many electronically implemented financial and transaction-based systems with practical applications for detecting suspect transactions. AI systems and models help improve both the efficiency and speed of the functional and analytic aspects far beyond what a human operator is able to achieve, using human cognitive abilities or pure mental processes. Undisputedly, the practical use and application of AI models has immensely contributed to improvements over the conventional classification and prediction technologies and continues to increase and enhance productivity and usefulness of new data driven electronic platforms and architectures.

AI systems may be trained using a particular form of a supervised approach, where knowledge from a previously trained model is transferred into the training process of a new model. A previously trained model is run in forward inference mode to yield scores on the same training examples as the new model being trained. Those scores are incorporated into a loss function which penalizes deviations between the new model's scores and/or internal states and the corresponding equivalents for the trained model. Often, the calculated loss is combined with a conventional supervised machine learning loss, which penalizes deviations from the model's predicted output and ground-truth labels or target values.

For optimization, the combined loss can be numerically minimized over the free parameters of the model being trained. Disadvantageously, the trained model is held fixed during the training process of the new model. As a result, only numerical values of scores obtained in a prior evaluation of the trained model are used in training the new model. Further, when the trained model's scores come from different model architectures than the new model, mismatches in score distributions can inhibit the performance of training. Systems and methods are needed that can overcome the noted shortcomings and improve over the conventional training approaches.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, a computer-implemented method to improve training and performance of artificial intelligence (AI) systems having one or more machine learning models stored in one or more data storage mediums connected in at least one computing network is provided. The method comprises receiving student model scores, generated by a student machine learning model stored in a data storage medium, the student machine learning model having a primary loss function; receiving teacher scores provided by one or more analytic resources, the teacher scores being provided based on known results and behavior of pre-existing machine learning models used for accomplishing a first series of classification objectives; transforming the teacher scores into transformed teacher scores, the transformed teacher scores having an estimated probability distribution within an established threshold of the student model scores probability distribution; constructing a distillation loss function between the student model scores and the transformed teacher model scores; and updating the primary loss function to a secondary loss function based on the constructed distillation loss function to accomplish at least the first series of classification objectives or a second series of classification objectives derived from the first series of classification objectives without training the student machine learning model from a primitive state.

The student machine learning model is trained based on the distillation loss function. The secondary loss function for the student machine learning model includes the first loss function with a multiplicative coefficient of zero or greater added to the distillation loss function with a multiplicative coefficient of zero or greater. The transformation from the teacher scores to the transformed teacher scores is accomplished according to:

$$\tilde{t} = S^{-1}[\mathcal{T}[t]],$$

$\mathcal{T}[\bullet]$ being an estimator of the teacher cumulative score distribution, and $S^{-1}$ being an estimator of the inverse of the student machine learning model cumulative score distribution, re-estimated during training of the student machine learning model and within the established threshold of the student model scores probability distribution.

In some aspects, the transformation of teacher scores comprises operating an indirect sort on an array of the teacher scores; creating a permutation of indices to sort the array of the teacher scores; inverting the permutation of indices to form a ranking; indexing an array of sorted student model scores based on the ranking; and generating the transformed teacher scores, responsive to the indexed array of sorted student model scores.

Depending on implementation, the distillation loss is invariant to a set of monotonic transformation operators on the teacher scores. The primary loss function is at least one of a classification loss or a regression loss. The student machine learning model is at least one of a logistic regression model, or an artificial neural network model. The transformation and subsequent machine learning steps occur on a mini-batch subset of one or more examples of a training dataset and the teacher scores. The distillation loss is at least one of a sum squared deviation between the student model scores and the transformed teacher scores, or a sum absolute deviation between the student model scores and the transformed teacher scores.

In one or more embodiments, the student model scores and transformed teacher scores are logits. The distillation loss is the Kullback-Liebler divergence between the probability distribution implied by the student model scores logits and the probability distribution implied by the transformed teacher scores logits. The distillation loss is the cross entropy between the probability distribution implied by the student model scores logits and the probability distribution implied by the transformed teacher scores logits. The logits are divided by a free parameter corresponding to a virtual temperature. The teacher scores are from a high-performance machine learning model, wherein the high-performance machine learning model has at least one measure of a higher complexity than the student machine learning model, or a different architecture than the student machine learning model.

The teacher scores are provided based on at least one of expert input, empirical resources, or a teacher machine learning model. The teacher scores are additional data elements paired with input data and the distillation loss forms an additional optimization criterion to balance with the primary loss function. The distillation loss is computed as a combination of multiple distillation sub-losses for one or more subsets, each subset stratified to a different selection of relevant examples entering the distillation losses, and the transformation from the teacher scores to the transformed teacher scores is estimated on each of the one or more subsets. The one or more subsets of the relevant examples correspond to different values of one or more labels in a classification task and a multiplicity of distillation loss functions associated with a multiplicity of the teacher scores constructed are included in the overall loss function for training the student machine learning model.

Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

As provided in further detail below, the practical application of innovative approaches and improvements disclosed herein are mainly relevant to supervised machine learning environments, where either classification or regression is used to train a model. More particularly, a primary or teacher model is utilized to train a secondary or student model. It is noteworthy that depending on implementation the practical application of the approaches discussed may be modified or extended to other environments without detracting from the scope of what has been defined here.

Figure 1:
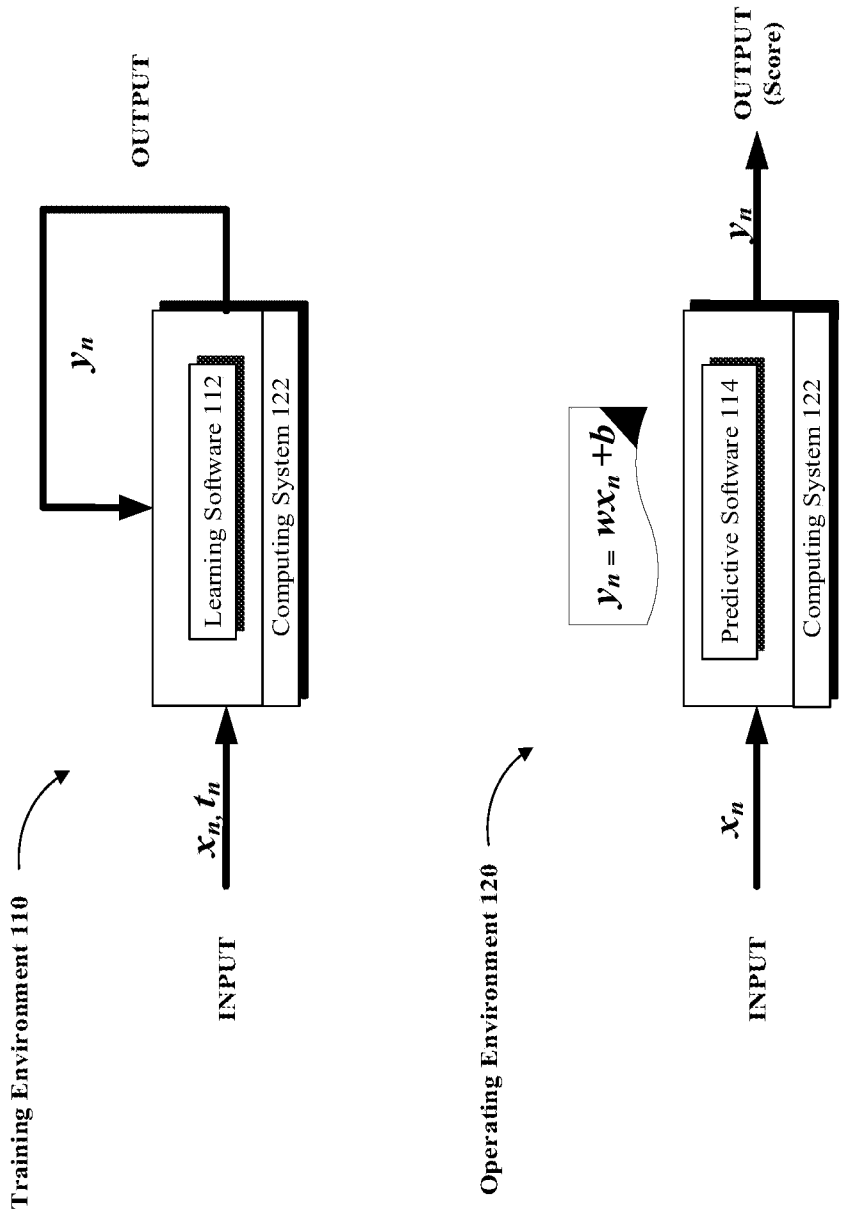
FIG. 1 illustrates example training and operation environments for training one or more artificial intelligence models in accordance with one or more embodiments.

Referring to FIG. 1, to provide a proper background, example training environment 110 and operating environment 120 are illustrated. As shown, a computing system 122 and training data may be used to train learning software 112. Computing system 122 may be a general purpose computer, for example, or any other suitable computing or processing platform. Learning software 112 may be a machine learning or self-learning software that receives event-related input data. In the training phase, an input event may be known as belonging to a certain category (e.g., fraudulent or non-fraudulent) such that the corresponding input data may be tagged or labeled as such.

In accordance with one or more embodiments, learning software 112 may process the input data associated with a target event, without paying attention to the labels (i.e., blindly), and may categorize the target event according to an initial set of weights (w) and biases (b) associated with the input data. When the output is generated (i.e., when the event is classified by learning software 112), the result may be checked against the associated labels to determine how accurately learning software 112 is classifying the events.

In the initial stages of the learning phase, the categorization may be based on randomly assigned weights and biases, and therefore highly inaccurate. However, learning software 112 may be trained based on certain incentives or disincentives (e.g., a calculated loss function) to adjust the manner in which the provided input is classified. The adjustment may be implemented by way of adjusting weights and biases associated with the input data. Through multiple iterations and adjustments, the internal state of learning software 112 may be continually updated to a point where a satisfactory predictive state is reached (i.e., when learning software 112 starts to more accurately classify the inputted events at or beyond an acceptable or established threshold).

In the operating environment 120, predictive software 114 may be utilized to process event data provided as input. It is noteworthy that, in the operating phase, input data is unlabeled because the classification of events being processed is unknown to the model. Software 114 may generate an output that classifies a target event as, for example, belonging to a first class (e.g., a fraudulent category) based on fitting the corresponding event data into the first class according to the training data received during the training phase. In accordance with example embodiments, predictive software 114 may be a trained version of learning software 112 and may be executed over computing system 122 or another suitable computing system or computing infrastructure to generate one or more scores that can be used to make determinations about an event.

In some applications, loss functions may be designed for training machine learning models to generate scores of relevant items with loss functions defined over multiple examples generated by a query, quantifying losses on pairs of responses or listwise as a function of an ordered list. In a supervised learning approach, the loss functions used for training the student model may be complex and depend on the specific numerical values and distribution scores from a primary model, also referred to as a teacher model. As provided in further detail below, in one implementation, the modification of conventional primary loss functions are not required for training a new model (e.g., secondary model or student model) and teacher model score distributions are transformed to better match the student model's score distributions.

In accordance with one aspect, a teacher model is used to train a student model with lower complexity based on distillation techniques that use the teacher model scores evaluated on that same dataset or upon application of stationary perturbations with the goal to gain as much of the teacher model's performance as possible with better complexity-performance tradeoff than training the student model directly on the labels. Another aspect is when a teacher model was trained on a different dataset than the current dataset being used for training, and a desired outcome is for the new model to score or rank selected subpopulations of examples reasonably similarly to the older model, so that adopting the newer model in a production scoring setting in place of the older model may cause less operational disruption. Yet another use case may utilize instead of a teacher model, some other external score, or quantified value related to the training examples where the goal is to train the student model in a multi-objective way to both achieve good enough performance on the conventional supervised performance task as well as push its scores to be closer to a particular trend or rank correlation with respect to the external score. Teacher scores may be utilized across different implementations whether or not the teacher scores are generated from a teacher machine learning model.

Model Compression

A provided in further detail herein, distillation refers to the process of transferring knowledge from a complex high-performing model or ensemble of models to a less complex model undergoing training. The less complex model may be more compact and suitable for efficient deployment or may be more robust in production due to the lower number of free parameters. The goal of distillation is to gain greater performance. This is in comparison to training the smaller model on its own with a supervised training algorithm on raw data which may not have the best performance.

In certain instances, the distillation losses require transfer of specific numerical values of teacher scores to the student model being trained, while performance criteria may depend on rank-ordering of scores, such as Receiver Operating Characteristic or Precision-Recall metrics for classification, which are not sensitive to the specific numerical values of the scores as long as rank ordering is preserved. When the teacher model's scores come from different model architectures than the model being trained, mismatches in score distributions from teacher to student can inhibit the performance of a conventional distillation procedure. The following provides a detailed approach that substantially improves the performance of the student model when trained in accordance with certain distillation losses.

Distillation to Improve Relevance of the Trained Model

In certain applied applications of machine learning decisioning, the external teacher score is not a similarly calibrated high-performing score on the same dataset. The outcome of training a model as provided herein is that the trained model's scores will have a higher rank correlation coefficient with the externally supplied teacher scores than a model trained in the ordinary fashion with only a conventional primary loss. This property is important in the area of decisioning with machine learning models where entire decision strategies are constructed based on the performance characteristics of existing models, particularly on subpopulations of the scoring population.

When the external score is not from a higher-performing model trained on the same dataset (i.e., outside the conventional setting of knowledge distillation), some performance loss is expected as measured on the primary supervised task alone, by using the additional distillation objective. This may be acceptable from a business standpoint if the value from increasing correlation to the teacher scores is judged to outweigh this performance loss. One consequence of our invention is to minimize the performance loss in this circumstance beyond the prior art, while still pushing the trained model to increase correlation to the teacher scores.

Non-exclusive examples of such teacher scores could be the score of a previous generation model already in use in production, or externally crafted quantifications which represent additional criteria to preferentially rank-order examples that the model being trained ought to attempt to respect. These requirements are part of developing responsible AI, and moreover allow for ethical treatment of customers through more seamless integration with the decisioning strategies that impact consumers for example in the areas of credit risk lending.

Distillation to Minimize Operational Impact in Model Retrains

In some instances, the practical application of predictive business decision models to real-world behavioral data is inevitably somewhat nonstationary. In a scenario of binary classification, for example, the observed outcomes are dichotomous in two classes (e.g. fraud or not-fraud, credit default or not-default), and the model produces a continuous-valued score which scales monotonically with the predicted probability of the positive class.

A relevant example is fraud detection in transaction streams. The model is trained to detect the small proportion of fraudulent examples in historical data and is then used in business operations to mitigate potential fraud in near real-time. The actual users of these fraud detection models will inevitably set up additional decisioning criteria beyond the score for selecting transactions for further investigation and impact customer actions, potentially based on information not known to the model during training such as judgements of expected monetary losses or impacts to customers who are valued differentially.

Because of the nonstationary behavior of the underlying data, the models require retraining periodically using more recently observed input and outcome (label) data, as an otherwise a fixed model would find its performance degrading over time on newer data. Common classification loss functions are frequently indifferent to the particular order of examples implied by the score within each class, i.e. the loss is invariant to permuting examples within the class. With a wide set of potential features to include in the model and a flexible well-parametrized model as is typical with modern machine learning, one can often find numerous models, all with extremely similar overall classification performance which nevertheless have significant differences in sensitivities to individual features.

Heuristically, there is a "shell" of nearly equivalently performing models across manifolds in parameter space, yet each may use features differently and correlate those features with scores differently. In a non-academic scenario, there may be additional considerations preferring some of these models over others. While maintaining similar score performance, a model may exhibit different behaviors and produce different customers impacted at the same score threshold based on the features chosen and nonlinearities learned during model training.

In other words, unless improved according to the method disclosed herein, said diversity of models in the shell may have numerous implications to degrading the validity of the subsequent scoring strategies applied with use of the machine learning score, and these behaviors that change are difficult for business strategy users to discover, and adjust with each model retrain presented. In one example embodiment, a new fraud detection model may offer increased detection performance by optimizing the classification loss on new data, but because of the indifference of the classification loss to intra-class ordering, the data examples stratified by the new model's score may have very different properties than those stratified by similar quantiles of the old model's score.

In certain instances, the downstream decisioning logic used for training a student model may be developed conditioned on behaviors and correlations exhibited in the scores of the teacher model. Such training may turn out to be invalid for the student model, despite the model performance being improved when measured exclusively on the detection metric. The overall decisioning system performance and palatability will be impacted when the retrained model is installed due to the inability for the decisioning system to adjust in time for changes in behaviors expressed in the scoring range of the new model. Although the fraud detection performance of the new model's score itself may be good, the users may find their set of decisioning rules to be needlessly invalidated by random chance, depending on which specific instance of the shell of the equal-performing models happened to be chosen in the naïve model training procedure.

Proper use of distillation during training as provided herein improves a model's performance, when models are updated to minimize needless changes from old to new models. Entire down-stream business decisioning strategies need significantly less adjustment to accommodate a new updated model, compared to a conventional retraining approach which does not use the old model's scores. This subsequently is a fundamental requirement of responsible AI, which extends to the use of the model and the entire decisioning process of the AI system.

In one or more aspects to resolve the internal non-stationarity of features in a model by way of score correlation, a new student model (e.g., secondary model) may be trained with a loss function optimizing classification performance on the new data, plus a distillation loss using a teacher model's (e.g., a primary model's) score. The result will often be a new model whose performance is comparable with that obtained with conventional training on only the new dataset, but with much greater stability with respect to other data observations in the sorted score profile.

Within the sets of examples stratified by the positive or negative classes, the new student model trained with distillation will sort examples more similarly to how the teacher model sorted examples. This can be quantitatively confirmed by observing increased Spearman rank-correlation coefficient between old scores and new scores as the importance of the distillation loss is increased. As such, the student model is more palatable than models trained with standard classification losses alone, which merely by misfortune of initial random parameters, might upset the downstream decisioning and consequent customer impact by being very different in additional correlation behaviors.

Figure 2A:
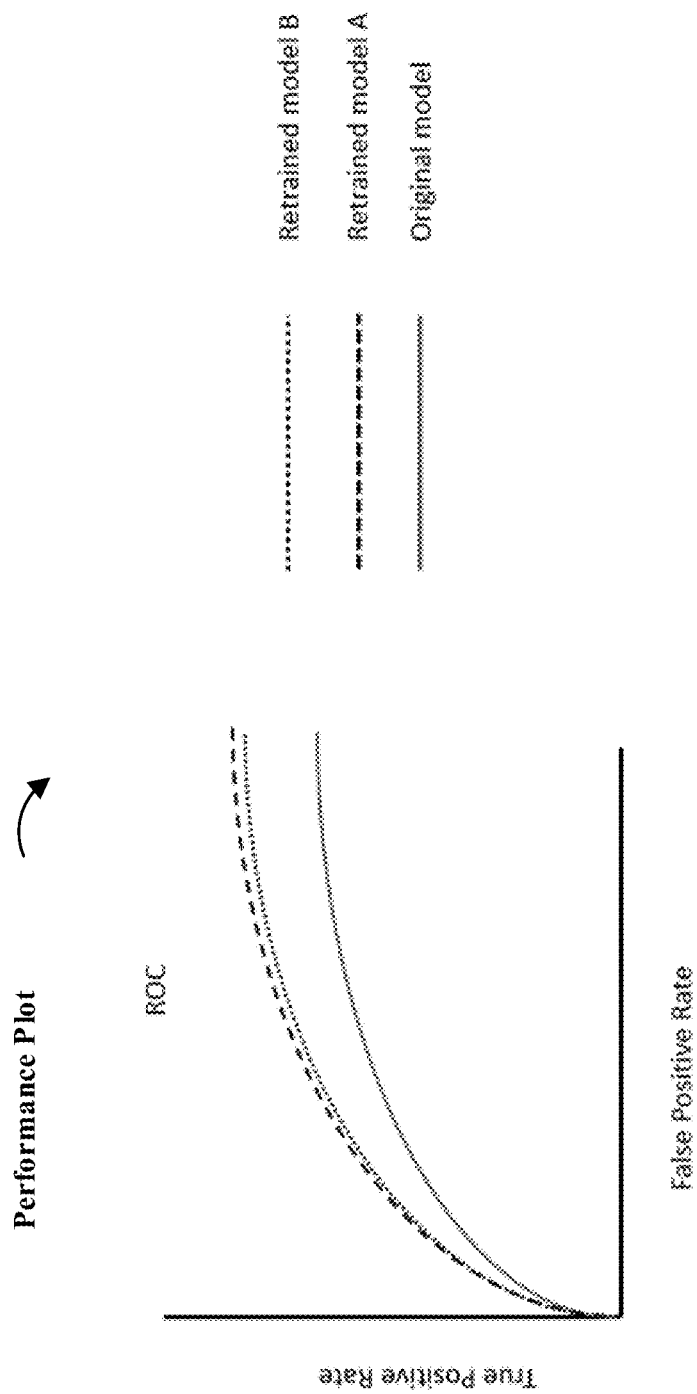
FIG. 2A is an illustrative example of a performance plot to evaluate payment card transaction models in accordance with one or more embodiments.

Referring to FIG. 2A, an illustrative example of a performance plot (Receiver Operating Characteristic) for evaluating payment card transaction models to detect fraud is provided. As shown, three curves correspond respectively to an "Original Model" (trained on earlier datasets), "Retrained Model A" (retrained on a new dataset in a conventional manner), "Retrained Model B" (retrained on a new dataset using our invention). Retrained Model A and Retrained Model B have almost the same performance.

Figure 2B:
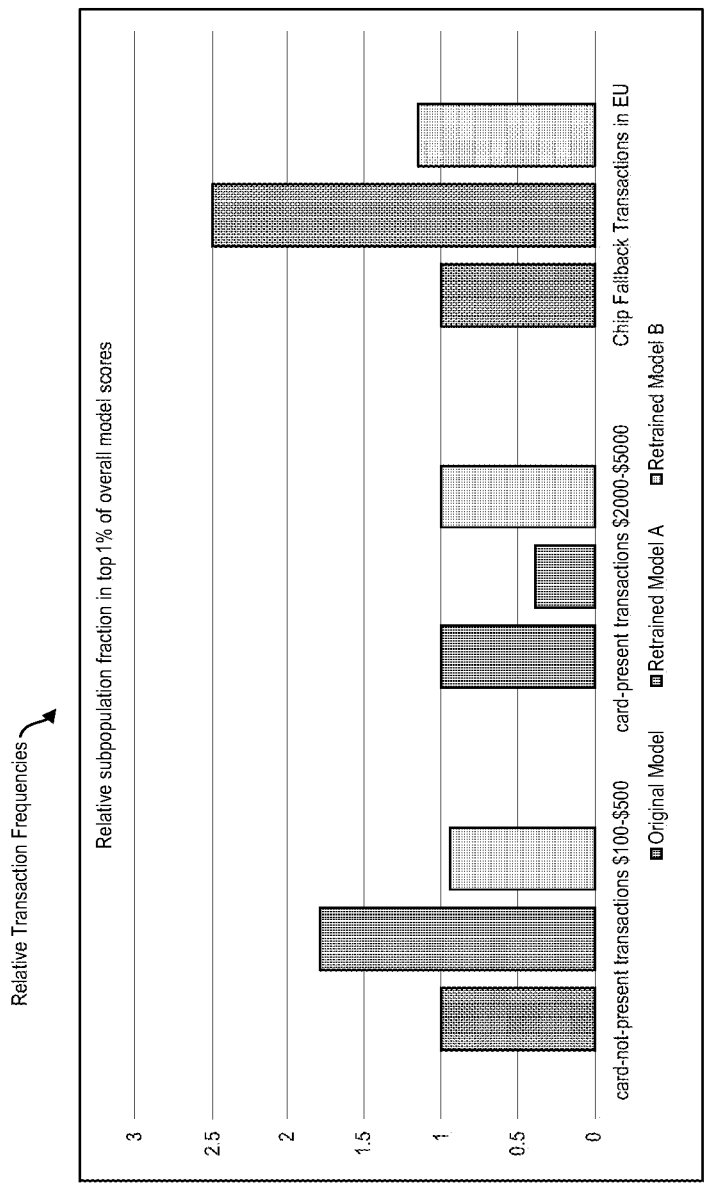
FIG. 2B, is an illustrative example of relative frequencies of certain subpopulations of transactions in accordance with one or more embodiments.

Referring to FIG. 2B, an illustrative example of relative frequencies of certain subpopulations of transactions is provided. Retrained Model A shows distinct difference in the relative weighting of certain subpopulations in the set of high scoring examples, whereas retrained Model B shows almost the same proportions as the original model. Retrained Model B may be strongly preferred operationally as decisioning systems conditioned on subpopulations, originally tuned on the results of Original Model, will need much less or no updating than the use of Retrained Model A.

Figure 3A:
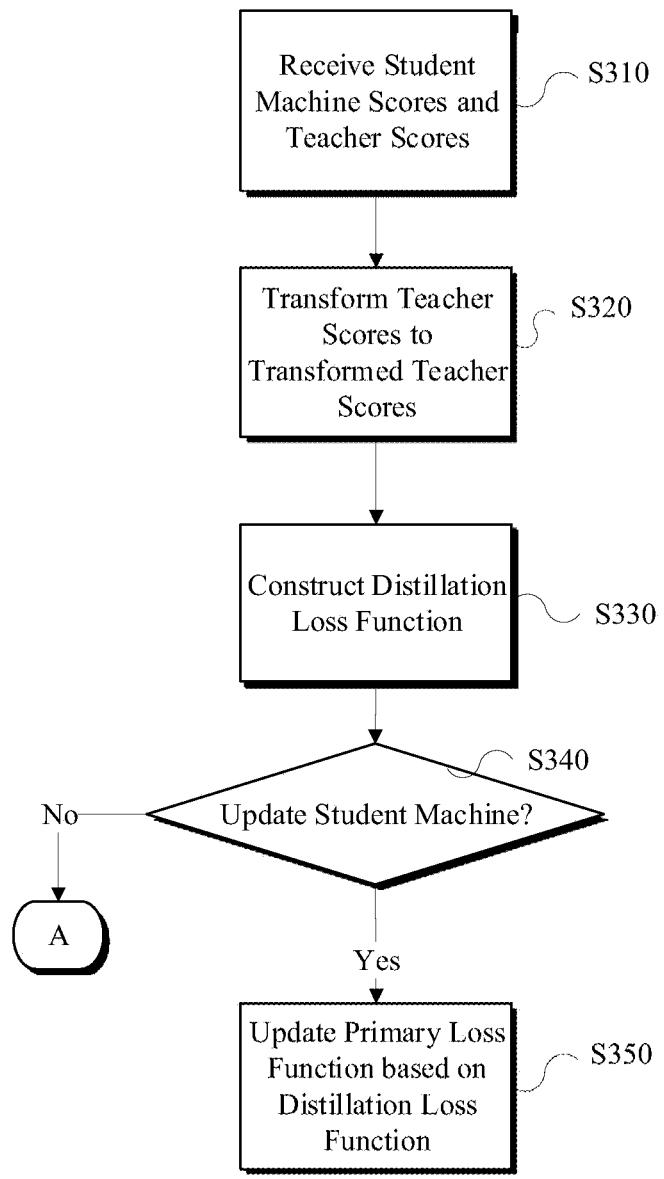
FIGS. 3A and 3B are example flow diagrams of a method of optimizing machine learning models by way of rank distillation in a supervised training environment, in accordance with one embodiment.
Figure 3B:
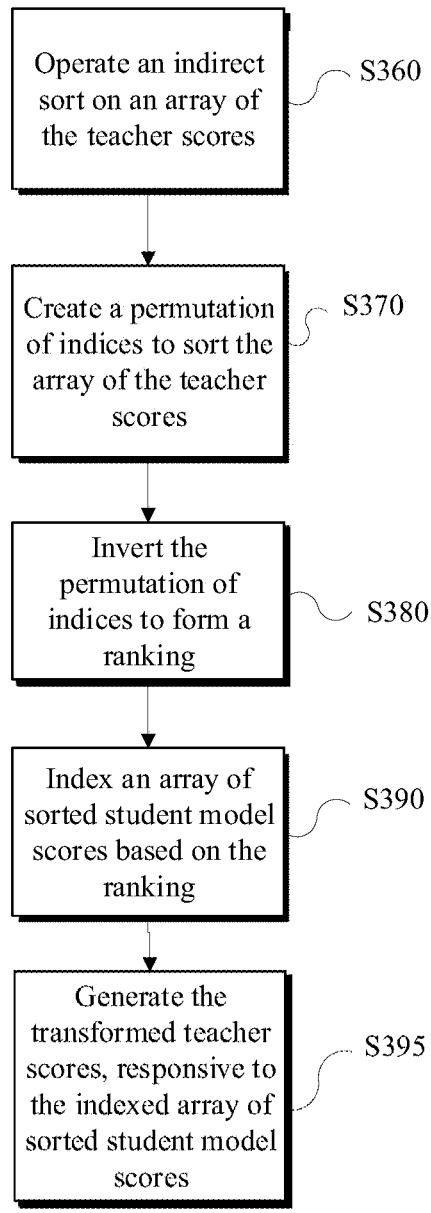

Referring to FIGS. 3A and 3B, a computer-implemented method to improve training and performance of an AI system is provided. As shown, student machine scores may be received along with teacher scores (S310). The student scores may be generated by a student machine learning model stored in a data storage medium. The student machine learning model has a primary loss function. The teacher scores may be provided by one or more analytic resources based on known results and behavior of pre-existing machine learning models used for accomplishing a first series of classification objectives.

In accordance with one aspect, the teacher scores are transformed into transformed teacher scores (S320). The transformed teacher scores may have an estimated probability distribution close to an estimate of the student model scores probability distribution. A distillation loss function may be constructed between the student model scores and the transformed teacher model scores (S330). Once it is confirmed that the student machine is to be updated (S340), the primary loss function to may be updated to a secondary loss function based on the constructed distillation loss function (S350).

The update may be configured to accomplish at least the first series of classification objectives or a second series of classification objectives derived from the first series of classification objectives without training the student machine learning model from a primitive state (e.g., an early training state in which a new model's training may be performed from raw data and based on a series of extensive trial and error procedures and readjustments until a certain level of accuracy is achieved. This process is resource extensive and expensive). Accordingly, training the student machine learning model based on the distillation loss function constructed from the transformed teacher scores can be substantially more efficient in both cost and time.

Referring to FIG. 3B, the transformation of teacher scores in accordance with one more embodiments comprises operating an indirect sort on an array of the teacher scores (S360), creating a permutation of indices to sort the array of the teacher scores (S370), and inverting the permutation of indices to form a ranking (S380). In certain aspects, an array of sorted student model scores may be sorted based on the ranking (S390) and the transformed teacher scores may be generated in response to the indexed array of sorted student model scores (S395).

Additional Distillation-Type Losses to Achieve Multi-Objective Optimization

In certain embodiments, multi-objective optimization is implemented. For instance, in a fraud detection scenario, a goal might be to classify fraud from non-fraud transactions with high performance. As an additional optimization criterion, it may be desirable to lower the impact of false positives particularly strongly on customers considered high-value or otherwise sensitive to fraud-mitigation actions by scoring those high-value customers lower than an otherwise unconstrained model. In this example, the external "score" is a different quantification which induces a ranking of examples with respect the secondary criterion. For continuity of notation, we continue to call this scenario and the secondary loss function to be "distillation" in this disclosure, though the setting is more general than model compression.

In the fraud scenario (where models are trained to score suspicious examples higher, indicating a need for further investigation), the external score would be a value inversely correlated with the customer's value or sensitivity to contact. The secondary loss function adds a pressure term to have the model score those examples which have lower teacher model values with lower scores than otherwise, in order to mitigate the adverse impact to contact-sensitive customers or any other operational requirements of the model encoded by the construction of the teacher scores. Similar applications can be applied to classes of customers associated with credit risk decisioning where this technique can be used to implement customer class considerations in providing for more fair lending objectives.

Rank Distillation

In certain aspects, means to construct distillation loss functions which negate the importance of the specific numerical values of the teacher scores is implemented such that rank-ordering is preserved. Because of the ample parameterization and feature set of many machine-learning models, a secondary objective can often be substantially optimized above a baseline. The impact to the primary objective, and hence performance, can be minimized while providing the business critical and responsible AI requirement of similar rank ordering behaviors to the teacher scores.

In one variation, the distillation method applies the score distillation independently on the sets of examples stratified by the value of the label. That is, the primary loss will directly concern the classification performance while the distillation loss attempts to impose a rank ordering from the teacher scores amongst the examples of the same class. This may be particularly useful when the teacher scores on their own do not have high performance on the primary loss and stratifying the distillation loss by class may reduce the performance hit from a low-performance teacher score further while still gaining significant per-example correlation with the teacher scores. This variation further helps the trained model achieve secondary goals with lesser impact to the primary performance criterion and enables the importance of the secondary goal to vary depending on the label.

In accordance with certain implementations, the combined loss function is the addition of a distillation loss to the primary loss function. Notating the student model scores, teacher scores and ground truth labels for a given example as $s_i, t_i, y_i$ from sets S, T, Y, a loss function may be defined as:

$$\mathcal{L}_{(S,T,Y)} = \gamma \ell_{(S,Y)} + \gamma_D \ell_{D(S,T)}$$

When the loss functions are decomposable into a sum over examples, the loss function may be defined as:

$$\mathcal{L}(S, T, Y) = \gamma \sum_{i=1}^{N} \ell(s_i, y_i) + \gamma_D \sum_{i=1}^{N} \ell_D(s_i, t_i)$$

The first loss function above is the conventional loss function comparing score to label, and the second loss function above is the distillation loss between student and teacher scores. The student model scores are a function of a machine learning model training operating on input features.

As an illustrative example, consider a binary classification, denoting $s_i, t_i$ as the continuous unbounded logits and $y_i \in \{-1, +1\}$ as labels for each example. Per example, the cross-entropy (Bernoulli likelihood) classification loss is $\ell(s,y) = -[y \log s + (1-y) \log(1-s)]$. Choices for distillation loss may include:

(a) cross-entropy $\ell_D(s,t) = -[\sigma(t) \log s + (1-\sigma(t)) \log(1-s)]$; $\sigma(t) = 1/(1+e^{-t/T})$, as in, the teacher model score is interpreted as providing a soft label [1] with an additional parameter of temperature T, or (b), powers of logit differences, $\ell_D(s,t) = |s-t|^p$.

It is noteworthy that the disclosed embodiments and implementations are not restricted to cases where are the primary loss function is decomposable as an independent sum over training examples, but those are the most common illustrative examples.

A significant challenge for model distillation is transferring the specific numerical values of the external score into a range and distribution for use in an acceptable combination with the currently trained score so that a sensible distillation loss can be applied. In a typical setting of traditional distillation such as model compression, there is not a problem with the numerical distributions of the teacher scores, because the teacher model typically has a compatible architecture with the same loss function as the student model, and is trained on exactly the same dataset, so then numerical values of the teacher model scores are successfully usable as-is in a distillation loss, for example, the logits from a probability calibrated teacher model like an artificial neural network trained with cross-entropy loss can be directly inserted using the distillation losses above into a student model with an identical primary loss as the teacher model When the teacher scores arise from a model trained on a different dataset, there may be problems with distillation using unmodified teacher scores when the label distribution or other data distributions on the teacher scores are distinct from that on the new training set. More problems arise when the teacher model is a distinct architecture from the student, such as transferring a tree ensemble generated teacher score to an artificial neural network student model, or vice versa. The distributional differences in scores across radically different model architectures and loss functions will often make distillation difficult with conventional distillation losses, resulting in poor performance in the student model even when the teacher model has high performance. The consequence of the mismatch is even more significant when the teacher model score is not designed as a predictive score at all but is a secondary criterion with arbitrary scale and distribution markedly different from that of student model scores.

In one implementation, the approach is to modify the distillation loss with a distribution transfer function which preserves the relative rank-ordering of scalar teacher scores by mapping raw teacher scores into the distribution of student model scores. After transformation the distillation loss is applied, $$\mathcal{L}(S,T,Y) = \gamma \ell(S,Y) + \gamma_D \ell_D(S, M[T]),$$

or when the losses are additive per example, $$\mathcal{L}(S, T, Y) = \gamma \sum_{i=1}^{N} \ell(s_i, y_i) + \gamma_D \sum_{i=1}^{N} \ell_D(s_i, M[t_i]),$$

with the operator M[•] applying a monotonic transformation to match the distribution of S, and user-set coefficients $\gamma$, $\gamma_D \geq 0$ governing the relative weighting of standard loss and distillation loss.

Conceptually, considering score sets S, T as random variables arising from probability distributions with cumulative distribution functions $\mathcal{S}$, $\mathcal{T}$, the transformation of a teacher model score to the student distribution is $\tilde{t} = M[t] = \mathcal{S}^{-1}[\mathcal{T}[t]]$,. In one embodiment, any appropriate estimator of probability distributions, parametric or non-parametric, may be used to accomplish this transformation. The estimators are typically updated frequently during the training process.

One preferred embodiment of such a transformation uses empirical cumulative distribution functions which may be efficiently implemented with standard sorting and indexing subroutines universally available in common programming systems. In practice, a sample of concrete student model scores and teacher scores are collected and sorted. The sort index of teacher scores is a permutation of N consecutive integers which indexes the sorted values into the original unsorted array. This permutation is inverted and used to as retrieval indices into an array of sorted student model scores. The result is a set of transformed scores which has the same empirical distribution as the set of student model scores, but with identical rank ordering as the teacher scores. The following exemplary python-like pseudo code transforms parallel arrays of N student and teacher scores:

```

# transform teacher_scores such that the set has
# the empirical distribution of student model scores,
# preserving teacher_scores rank ordering
def RankTransformation(N, student_scores, teacher_scores): _, teacher_idx=sort(teacher_scores) teacher_ranks[teacher_idx]=range(N) # invert permutation student_sorted, _=sort(student_scores) return student_sorted[teacher_ranks]
```

In one implementation, the system transfers and distills using the rank-ordering of the teacher scores and lets the model optimization choose the distribution of student model scores as necessary to fulfill the distillation and primary objective with lowest loss. The advantage is the ability to use simple distillation losses like cross entropy or mean squared error, or mean absolute error, even when the raw teacher scores naturally have different distributions than student model scores.

In certain aspects involving minibatch stochastic gradient descent training, the transformation is applied to a reasonable sized minibatch of examples that are, for example, sufficient to get a reasonably accurate empirical CDF. In this example scenario, the loss is computed with the transformed teacher scores, and the model parameters are updated by taking a gradient descent step on the combined loss function. This embodiment may be implemented in programming code for loss functions, which take sets of features, labels, and coordinated teacher scores on those examples. It is noteworthy that depending on implementation, the set of teacher scores and student model scores used to create the transformation estimator may or may not be the same set of scores as that used in the loss function.

Example Extensions

An example extension of the above systems and methodologies may be applied to multinomial classification, where there is a set of teacher scores needing to be transformed per example. The transformation of a class as a "one-vs-others" binary classification problem may be considered and a transformation per class may be performed, using techniques suitable for binary classification.

Model distillation with teacher scores which are not highly performant on the primary loss will inevitably lower performance of the student model with increasing strength of distillation. In other words, there is a tradeoff between model performance and degree of rank-order correlation of scores with teacher scores. It is desirable to lower performance penalty in circumstances outside traditional model distillation scenarios, such as when the teacher model score is an additional criterion for multi-objective optimization.

In certain instances, a practical application of the disclosed systems and methods herein may be extended to classification problems, where multiple transformation operators on subsets of teacher and student model scores are estimated. For example, subsets are selected corresponding to each class (distinct value of the label). Then a distillation loss is separately applied to those classes. For binary classification, for example, the loss function may be expressed as:

$$\mathcal{L}(S, T, Y) = \gamma \sum_{i=1}^{N} \ell(s_i, y_i) +$$

$$\gamma_{D1}\sum_{i=1}^{N}\delta(y_i = +1)\ell_D(s_i, M_+[t_i]) + \gamma_{D2}\sum_{i=1}^{N}\delta(y_i = -1)\ell_D(s_i, M_-[t_i])$$

The estimators $M_+$, $M_-$ are created using those two subsets of student and teacher scores selected by the value of the label. This may be extended to multinomial case as well by selecting subsets on each subset with the given labels, and to regression problems by creating a selection function to dichotomize the continuous target into discrete classes.

The class-stratified distillation lowers the performance penalty for increasing correlation to the teacher model score when the teacher model score is not designed to be a high-performance score. This is because the primary loss function directly concerns the separation of classes permitting the primary loss to drive performance, and the distillation losses is concerned with transferring rank ordering from teacher to student within each class. One scenario which motivates the use of this variation is fraud detection, when the rare positive class is fraud, and the much larger set of negatives is non-fraud.

In one embodiment, the distillation loss may be applied to the negative examples exclusively (e.g., the distillation term stratified on the positive examples has a zero coefficient). This application may be, for example, when the external score quantifies the sensitivity of a good (e.g., non-fraud) customer to an erroneous fraud intervention. This teacher model score should have little predictive performance on detecting fraud (predicting the label), so the model is desirably free to order the fraud examples over the non-fraud examples to maximize classification performance, while working to ameliorate impact to the highly-sensitive good customers (e.g., influence the sorting of scores only of the non-fraud customers).

In certain instances, there may be much greater sensitivity to impacting good customers erroneously. This allows for the most flexibility in driving fraud outcomes into the decisioning logic. Multiple distillation losses may be used, each with their own teacher scores to simultaneously maintain internal continuity with a previous model as well as to minimize customer impact.

Figure 4:
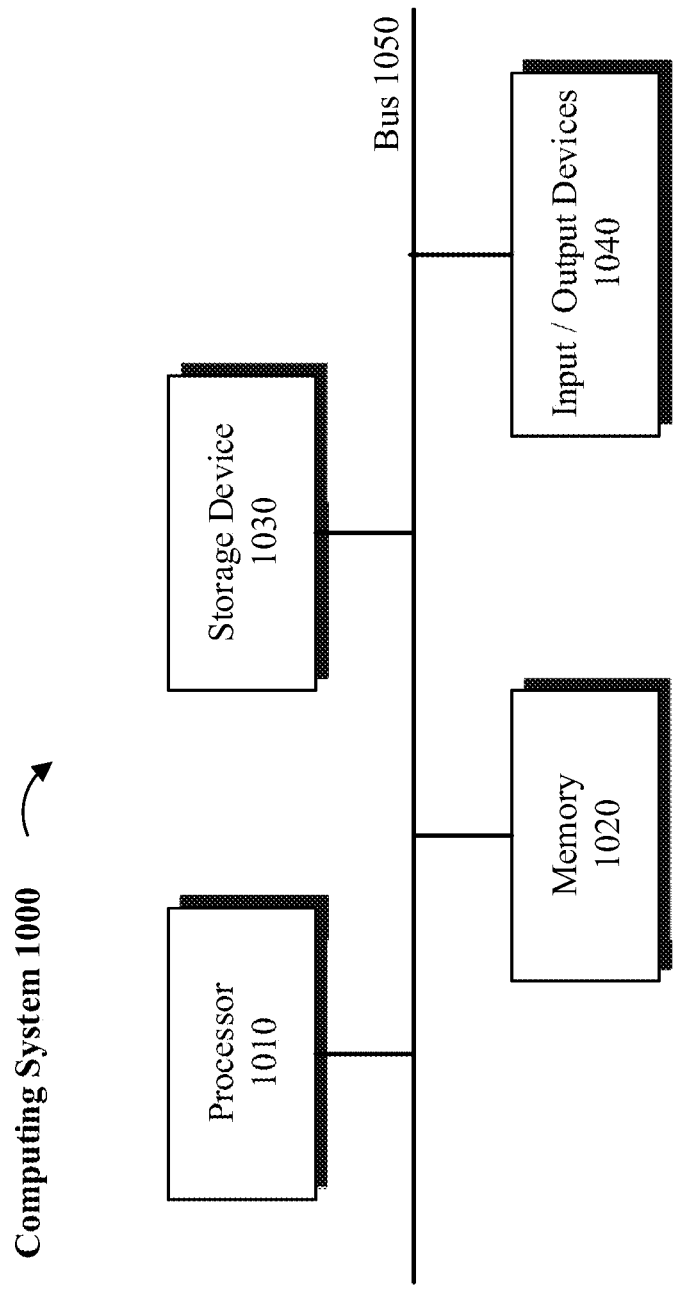
FIG. 4 is a block diagram of an example computing system that may be utilized to perform one or more computing operations or processes as consistent with one or more disclosed features.

Referring to FIG. 4, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 4, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal.

The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

COPYRIGHT & TRADEMARK NOTICES

A portion of the disclosure of this patent document may contain material, which is subject to copyright protection. The applicant has no objection to the reproduction of the patent documents or the patent disclosure as it appears in the Patent and Trademark Office patent files or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

The invention claimed is:

1. A computer-implemented method to improve training and performance of artificial intelligence (AI) systems having one or more machine learning models stored in one or more data storage mediums connected in at least one computing network, the method comprising:
   receiving student model scores, generated by a student machine learning model stored in a data storage medium, the student machine learning model having a primary loss function;
   receiving teacher scores provided by one or more analytic resources, the teacher scores being provided based on known results and behavior of pre-existing machine learning models used for accomplishing a first series of classification objectives;
   transforming the teacher scores into transformed teacher scores, the transformed teacher scores having an estimated probability distribution within an established threshold of the student model scores probability distribution;
   constructing a distillation loss function between the student model scores and the transformed teacher scores;
   updating the primary loss function to a secondary loss function based on the constructed distillation loss function to accomplish at least the first series of classification objectives or a second series of classification objectives derived from the first series of classification objectives without training the student machine learning model from a primitive state,
   wherein the transformation from the teacher scores t to the transformed teacher scores $\tilde{t}$ is accomplished according to:

$\tilde{t} = \mathcal{S}^{-1}[\mathcal{T}_{[t]}]$, $\mathcal{T}[\cdot]$ being an estimator of the teacher cumulative score distribution, and
   $\mathcal{S}^{-1}$ being an estimator of the inverse of the student machine learning model cumulative score distribution, re-estimated during training of the student machine learning model and within the established threshold of the student model scores probability distribution.

2. The method of claim 1, wherein the student machine learning model is trained based on the distillation loss function.

3. The method of claim 1, wherein the secondary loss function for the student machine learning model includes the first loss function with a multiplicative coefficient of zero or greater added to the distillation loss function with a multiplicative coefficient of zero or greater.

4. The method of claim 1, wherein the transformation of teacher scores comprises:
   operating an indirect sort on an array of the teacher scores;
   creating a permutation of indices to sort the array of the teacher scores;
   inverting the permutation of indices to form a ranking;
   indexing an array of sorted student model scores based on the ranking; and
   generating the transformed teacher scores, responsive to the indexed array of sorted student model scores.

5. The method of claim 1, wherein the distillation loss is invariant to a set of monotonic transformation operators on the teacher scores.

6. The method of claim 1, wherein the primary loss function is at least one of a classification loss or a regression loss.

7. The method of claim 1, wherein the student machine learning model is at least one of a logistic regression model, or an artificial neural network model.

8. The method of claim 1, wherein the transformation and subsequent machine learning steps occur on a mini-batch subset of one or more examples of a training dataset and the teacher scores.

9. The method of claim 1, wherein the distillation loss is at least one of a sum squared deviation between the student model scores and the transformed teacher scores, or a sum absolute deviation between the student model scores and the transformed teacher scores.

10. The method of claim 1, wherein the student model scores and transformed teacher scores are logits.

11. The method of claim 10, wherein the distillation loss is the Kullback-Liebler divergence between the probability distribution implied by the student model scores logits and the probability distribution implied by the transformed teacher scores logits.

12. The method of claim 10, wherein the distillation loss is the cross entropy between the probability distribution implied by the student model scores logits and the probability distribution implied by the transformed teacher scores logits.

13. The method of claim 10, wherein the logits are divided by a free parameter corresponding to a virtual temperature.

14. The method of claim 1, wherein the teacher scores are from a high-performance machine learning model, wherein the high-performance machine learning model has at least one measure of a higher complexity than the student machine learning model, or a different architecture than the student machine learning model.

15. The method of claim 1, wherein the teacher scores are provided based on at least one of expert input, empirical resources, or a teacher machine learning model.

16. The method of claim 2, wherein the teacher scores are additional data elements paired with input data and the distillation loss forms an additional optimization criterion to balance with the primary loss function.

17. The method of claim 1, wherein the distillation loss is computed as a combination of multiple distillation sub-losses for one or more subsets, each subset stratified to a different selection of relevant examples entering the distillation losses, and the transformation from the teacher scores to the transformed teacher scores is estimated on each of the one or more subsets.

18. The method of claim 17, wherein the one or more subsets of the relevant examples correspond to different values of one or more labels in a classification task and a multiplicity of distillation loss functions associated with a multiplicity of the teacher scores constructed are included in an overall loss function for training the student machine learning model.

19. A system comprising:
   at least one programmable processor; and
   a non-transitory machine-readable medium storing instructions that, when executed by the at least one programmable processor, cause the at least one programmable processor to perform operations comprising:

receiving student model scores, generated by a student machine learning model stored in a data storage medium, the student machine learning model having a primary loss function;

receiving teacher scores provided by one or more analytic resources, the teacher scores being provided based on known results and behavior of pre-existing machine learning models used for accomplishing a first series of classification objectives;

transforming the teacher scores into transformed teacher scores, the transformed teacher scores having an estimated probability distribution close to an estimate of the student model scores probability distribution;

constructing a distillation loss function between the student model scores and the transformed teacher scores; and updating the primary loss function to a secondary loss function based on the constructed distillation loss function to accomplish at least the first series of classification objectives or a second series of classification objectives derived from the first series of classification objectives without training the student machine learning model from a primitive state, wherein the transformation from the teacher scores t to the transformed teacher scores $\tilde{t}$ is accomplished according to:

$$\tilde{t} = \mathcal{S}^{-1}[\mathcal{T}[t]],$$

$\mathcal{T}[\bullet]$ being an estimator of the teacher's cumulative score distribution, and $\mathcal{S}^{-1}$ being an estimator of an inverse of the student machine learning model cumulative score distribution, re-estimated during training of the student machine learning model and within an established threshold of the student model scores probability distribution.

* * * * *